July 16, 1957 E. S. TUPPER 2,799,086
MEASURING AND SCOOPING CYLINDER
Filed Nov. 17, 1954 2 Sheets-Sheet 1
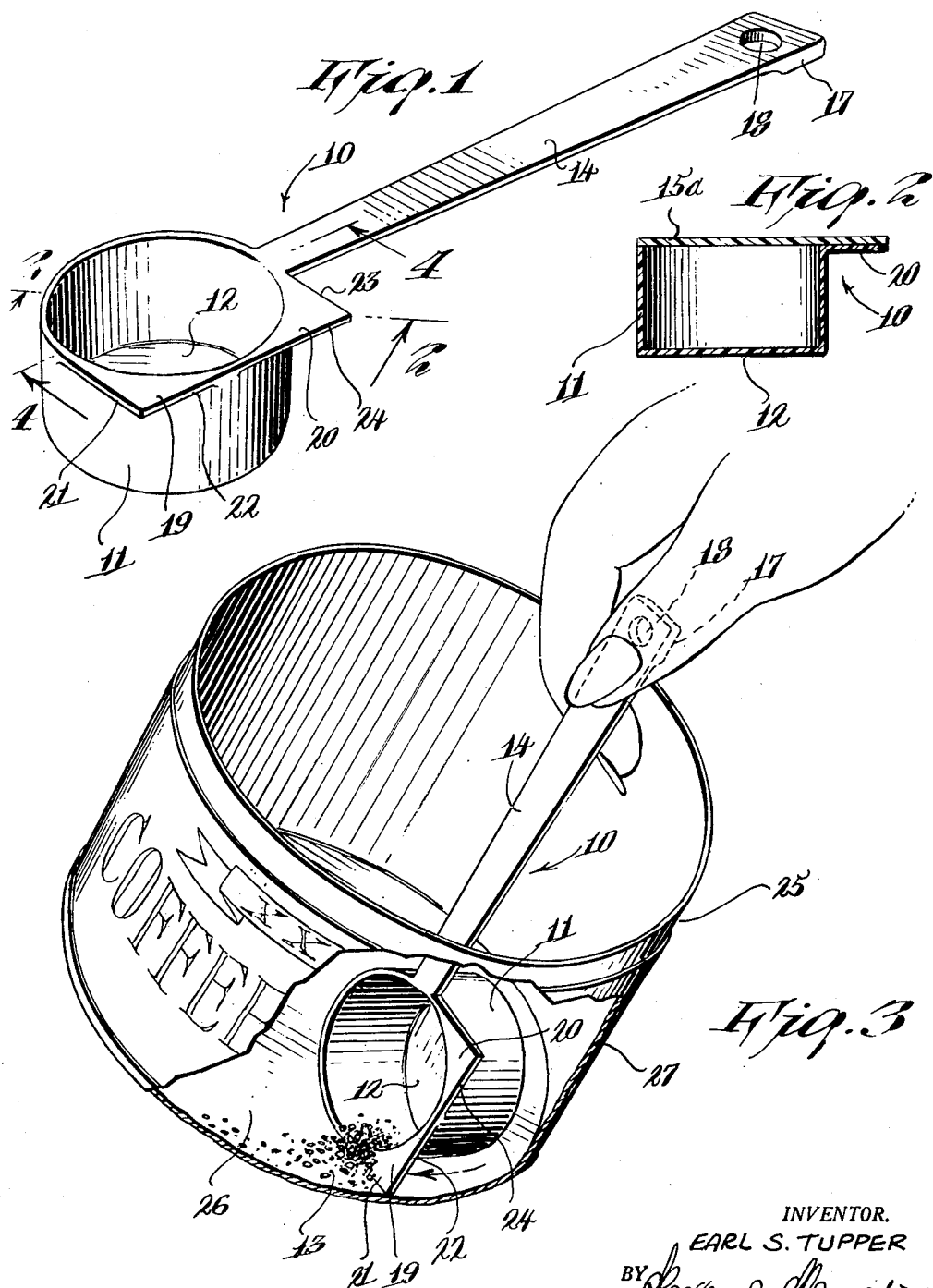
INVENTOR.
EARL S. TUPPER
BY
ATTORNEY July 16, 1957  E. S. TUPPER  2,799,086
MEASURING AND SCOOPING CYLINDER
Filed Nov. 17, 1954  2 Sheets-Sheet 2
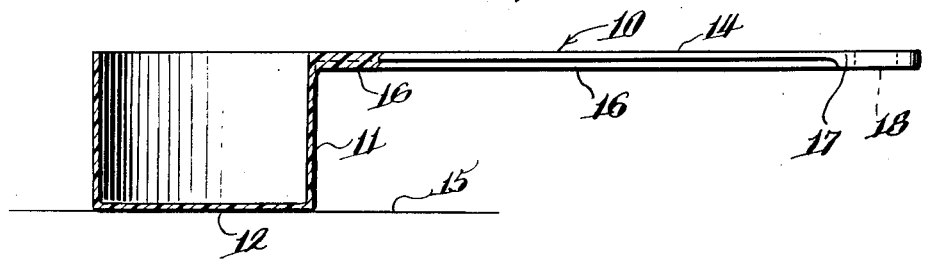
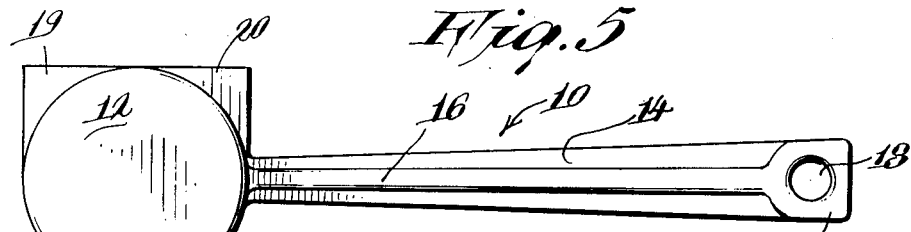
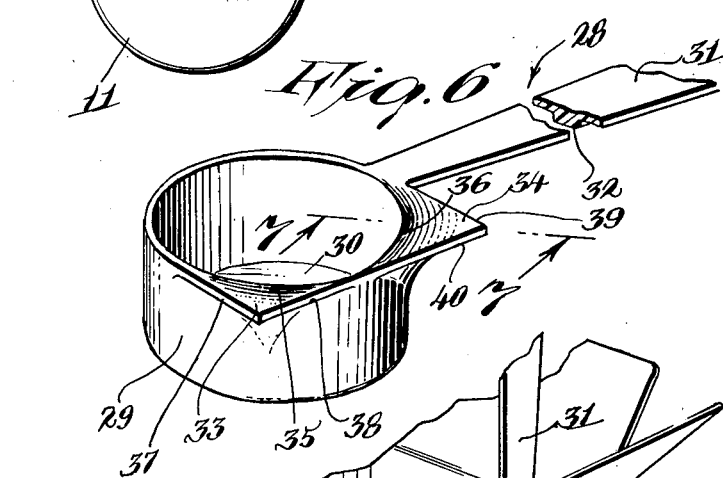
INVENTOR.
EARL S. TUPPER.
BY
ATTORNEY

United States Patent Office 2,799,086
Patented July 16, 1957

2,799,086

MEASURING AND SCOOPING CYLINDER

Earl S. Tupper, Upton, Mass.

Application November 17, 1954, Serial No. 469,523

1 Claim. (Cl. 30—142)

This invention relates generally to a measuring and scooping device, but more particularly to a device of this type provided with at least a pair of perpendicular edges running tangentially with cylindrical, polygonal or curved side walls at a ninety degree interval for purposes of contacting the side and bottom wall portions of containers formed either as cylinders or of rounded or polygonal shape.

The main object of the invention resides in the provision of a relatively deep measuring chamber having straight vertical walls in section and wherein the contents remaining on the bottom of the container are easily scooped up by simultaneous engagement of the side and bottom walls of said container so that the material in the corners of the vessel can be easily removed and introduced into the measuring cylinder without agitating the container as is conventionally done to provide a hill or mass of material in granulated, soft, viscous or other form of aggregation.

A further object of the invention resides in the provision of a measuring and scooping cylinder or chamber having a handle integral therewith and lying in the same plane as the upper edge of the cylinder for handling purposes and wherein the device is capable of normal use above the bottom of the material container.

A further feature of the invention resides in the provision of a measuring and scooping cylinder or other deep chamber which is capable of standing up without tilting.

Another object of the invention resides in the provision of a measuring chamber having means for scooping up the remains of material, such as coffee, on the bottom of a vessel such as a can and wherein the scooping edges are hollowed for directing the material into the cylindrical portion of the device.

Another feature of the invention is to provide a scooping element which is capable of standing on a platform without tilting and of receiving thereon a cover member for purposes of storage.

A further feature of the invention resides in the provision of a measuring cylinder or chamber which is economical to manufacture, durable to use, efficient in operation, inert to chemicals and foods, odorless and strong.

These objects and other incidental ends and advantages of the invention will hereinafter appear in the progress of the disclosure and as pointed out in the appended claim.

Accompanying this specification are drawings showing a preferred form of the invention wherein:

Figure 1 is a perspective view of one form of the invention;

Figure 2 is a vertical sectional view thereof taken along the plane 2—2 of Figure 1;

Figure 3 is an enlarged perspective view shown partly broken away of a container such as a coffee can and showing the invention in operative use therewithin for purposes of scooping up the remains of a supply of coffee therein;

Figure 4 is a side view of the said form of the invention shown partly in elevation and partly in section;

Figure 5 is a bottom plan view of the device;

Figure 6 is a fragmentary perspective view shown partly broken away of a modified form of the invention;

Figure 7 is an enlarged vertical sectional view thereof taken along the plane 7—7 of Figure 6; and Figure 8 is a perspective view shown partly broken away of a polygonal-shaped vessel and illustrating the device in operative use therewithin for scooping up the remains of material from a corner of the vessel.

In accordance with the invention and more particularly as shown in Figures 1 through 5, numeral 10 indicates generally a measuring and scooping chamber in the form of a cylinder embodying the features of the present invention, and includes a hollow, substantially cylindrical scooping member portion 11 as illustrated.

The scooping portion 11 is integrally formed with a circular bottom wall 12 at substantially right angles thereto and is adapted to contain a given amount of any type of material including food, chemical or other industrial materials, but as shown the material is coffee 13.

Scooping cylinder 11 is integrally formed along its upper edge with a flat, elongated handle 14, the longitudinal sides of which converge slightly towards the cylinder (Figure 5). It will be noted that the upper surface of the handle 14 (Figure 4) lies in the same plane as the open upper edge of the cylinder 11.

The handle 14 is relatively thin so as to permit the device to be supported on a horizontal surface 15 (Figure 4) without tipping over and is thereby capable of receiving a separable cover member 15a for purposes of storage as shown in Figure 2.

The undersurface of the handle 14 is integrally formed with a longitudinal rib 16 extending substantially the length thereof for imparting greater strength and rigidity to the relatively thin handle 14, the rib 16 merging with a thickened portion 17 provided in the end of the handle remote from the cylinder 11. The thickened portion 17 is provided with an opening 18 therethrough for purposes of supporting the device when not in use upon a nail or the like. Thus, the thickened portion 17 reinforces handle 14 and serves to prevent the splitting of the end 17 of the handle when supported upon a nail or the like.

The upper edge of the cylindrical portion 11 along one side is integrally formed at right angles thereto with a pair of right triangular flaps 19 and 20, the upper surface of these flaps lying in the same plane as the upper open edge of the cylinder 11 (Figure 2).

As shown in Figure 1, the flap 19 includes a straight lateral edge 21 and a straight longitudinal edge 22, the edges 21 and 22 being disposed at substantially right angles to each other.

It will also be seen that the flap 20 includes a lateral edge 23 (which need not be necessarily straight as shown) and a longitudinal edge 24, the edges 23 and 24 as shown for illustration being disposed at substantially right angles to each other. It will also be noted that the edges 22 and 24 are aligned longitudinally with each other and form a unitary edge extending substantially parallel to the longitudinal axis of handle 14.

By means of this construction, the device 10 may be inserted downwardly within a coffee can 25 or other vessel to permit lateral edge 21 to scrape the bottom wall 26 of the vessel and longitudinal edges 22, 24 to scrape the side wall 27 (Figure 3) whereby to scoop up the remains of the ingredients coffee 13 in the bottom of the container without agitating the latter as is conventionally done to provide a mass or hill of the material whatever its state of aggregation. It will be noted that lateral edge 21 and longitudinal edges 22, 24 are also adapted to simultaneously contact the bottom and side walls of other shaped containers, for example boxes and the like. Thus, contents 13 in the bottom of vessel 25 are easily scooped up by simultaneously engaging the side and bottom walls of said material holding vessel so that the material gathered in the corners of the vessel can easily be dislodged, gathered, removed and introduced into the measuring cylinder 11.

It will be noted that handle 14 lies in the same plane as the upper edge of the spoon 11 for handling purposes and that the device is capable of normal use above the bottom of the material container.

Referring now particularly to Figures 6 through 8, there is shown a modified form of the present invention indicated generally at 28 and includes a substantially cylindrical or other deep type of hollow scooping portion 29 integrally formed with a bottom wall 30 at right angles thereto. Cylinder 29 is adapted to measure and contain therewithin a given amount of material as does cylinder 11.

Cylinder 29 at its upper edge is integrally formed with an elongated flat handle 31, the upper surface of which lies in the same plane as the upper edge of the cylinder in a manner similar to the first form, the handle 31 on the undersurface thereof being provided with a rib 32 for reinforcing purposes.

The upper edge of the cylinder 29 is again formed with at least one triangular flap although a pair of right triangular flaps 33 and 34 are shown. However, in this form of the invention, the flaps 33, 34 are now of curved vertical cross-section so as to present concave upper faces which merge with the walls of the cylinder 29 along the curved portions 35 and 36. Thus, the material will be directed from the edges of the flaps 33, 34 into the cylindrical portion 29.

As shown in Figure 6, flap 33 includes a straight lateral edge 37 and a straight longitudinal edge 38, the edges 37 and 38 being disposed at substantially right angles to each other. It will also be seen that the flap 34 includes a lateral straight edge 39 and a longitudinal edge 40, the edges 39 and 40 being similarly disposed at right angles to each other. The edges 38 and 40 are aligned longitudinally with each other to form a unitary edge extending substantially parallel to the longitudinal axis of the handle 31.

As shown in Figure 8, the device may be employed for removing material from the corners of the vessel 41 with the lateral edge 37 engaging the bottom wall 42 of the vessel and the longitudinal edges 38, 40 engaging the side wall 43 thereof. Thus, the device may be used for scooping up the remains of material in the corners of the box or container, the hollowed portions of the flaps directing the material into the deep or cylindrical portion of the scoop.

The device is preferably formed by any conventional type of molding or forming from a plastic material such as polystyrene or relatively thick-gauged polyethylene, vinyl or the like. The plastic is chosen for being hard, scratch-proof, not easily granulated, odorless, inert to chemicals, not subject to easy breakage, non-absorptive and easily cleaned for sanitary purposes. The gauge of material used is selective.

I wish it understood that minor changes and variations in the location, size, integration, combination, material and form of molding the parts may all be resorted to without departing from the spirit of the invention and the scope of the appended claim.

I claim:

A scooping and measuring spoon comprising a hollow measuring portion with an annular peripheral edge, an outwardly upwardly curved scooping portion extending laterally from the hollow measuring portion, said scooping portion being concave or convex in vertical section, concave on its lower face and convex on its upper face, said scooping portion terminating at its upper level in two straight scraping edges meeting substantially at right angles to each other, coplaner with the annular peripheral edge of the hollow measuring portion and respectively running tangentially with respect thereto and a handle portion extending horizontally from the hollow measuring portion.

References Cited in the file of this patent

UNITED STATES PATENTS

| 350,810 | Cole | Oct. 12, 1886 |
| 944,091 | Harn | Dec. 21, 1909 |
| 2,080,210 | Mafra | May 11, 1937 |
| 2,230,479 | Becher | Feb. 4, 1941 |

FOREIGN PATENTS

| 66,142 | Netherlands | July 15, 1950 |

OTHER REFERENCES

Strand, Jr., Design Patent 127,543, May 27, 1941.